United States Patent [19]

Creighton

[11] 3,819,330

[45] June 25, 1974

[54] FLUID MONITORING SYSTEM AND FLUID SAMPLING METHOD AND APPARATUS FOR USE THEREWITH

[75] Inventor: David M. Creighton, Hacienda Heights, Calif.

[73] Assignee: International Telephone and Telegraph Corporation, New York, N.Y.

[22] Filed: Feb. 7, 1972

[21] Appl. No.: 224,026

[52] U.S. Cl. .......... 23/254 E, 23/253 R, 23/254 R, 73/421.5, 73/423, 222/3
[51] Int. Cl. .................. G01n 1/22, G01n 27/44
[58] Field of Search .......... 23/254 R, 254 E, 253 R, 23/232 R, 232 E, 230 R; 204/195 T; 222/3; 73/421.5, 423; 137/525

[56] References Cited
UNITED STATES PATENTS

| | | | |
|---|---|---|---|
| 2,846,121 | 8/1958 | Ronnebeck | 23/253 X |
| 3,122,168 | 2/1964 | Wright | 23/253 |
| 3,162,585 | 12/1964 | De Ford et al. | 23/253 UX |
| 3,222,135 | 12/1965 | Ashmead | 23/259 X |
| 3,297,053 | 1/1967 | McKinney | 23/253 |
| 3,362,228 | 1/1968 | Stuben | 23/255 X |
| 3,615,241 | 10/1971 | Low | 23/253 X |
| 3,675,466 | 7/1972 | Linenberg | 23/254 |

*Primary Examiner*—R. E. Serwin
*Attorney, Agent, or Firm*—A. Donald Stolzy

[57] ABSTRACT

A method and system which may be employed for monitoring hydrogen sulfide and sulfur dioxide in flue gases including a probe having an air supply to pick up a sample. Delivery and dilution is performed automatically and immediately after a sample is taken. Prior art conduit clogging is avoided by the immediation dilution. The diluted sample is conveniently titrated although an air-sample mixer is connected between the probe and the titrator. Continual sampling is performed by the use of a pulse oscillator which repeatedly energizes a probe solenoid. Repeated pressure indications occur when the probe pick up is in a sample pick up position. The probe pick up cavity is repeatedly purged immediately after each sample is taken to keep the cavity clean. The probe includes an inner hollow teflon cylinder which is in pressure contact with an outer concentric stainless steel cylinder. The teflon has axial grooves to provide fluid tight passageways or conduits. The teflon is kept in axial compression to keep the grooves fluid tight.

13 Claims, 8 Drawing Figures

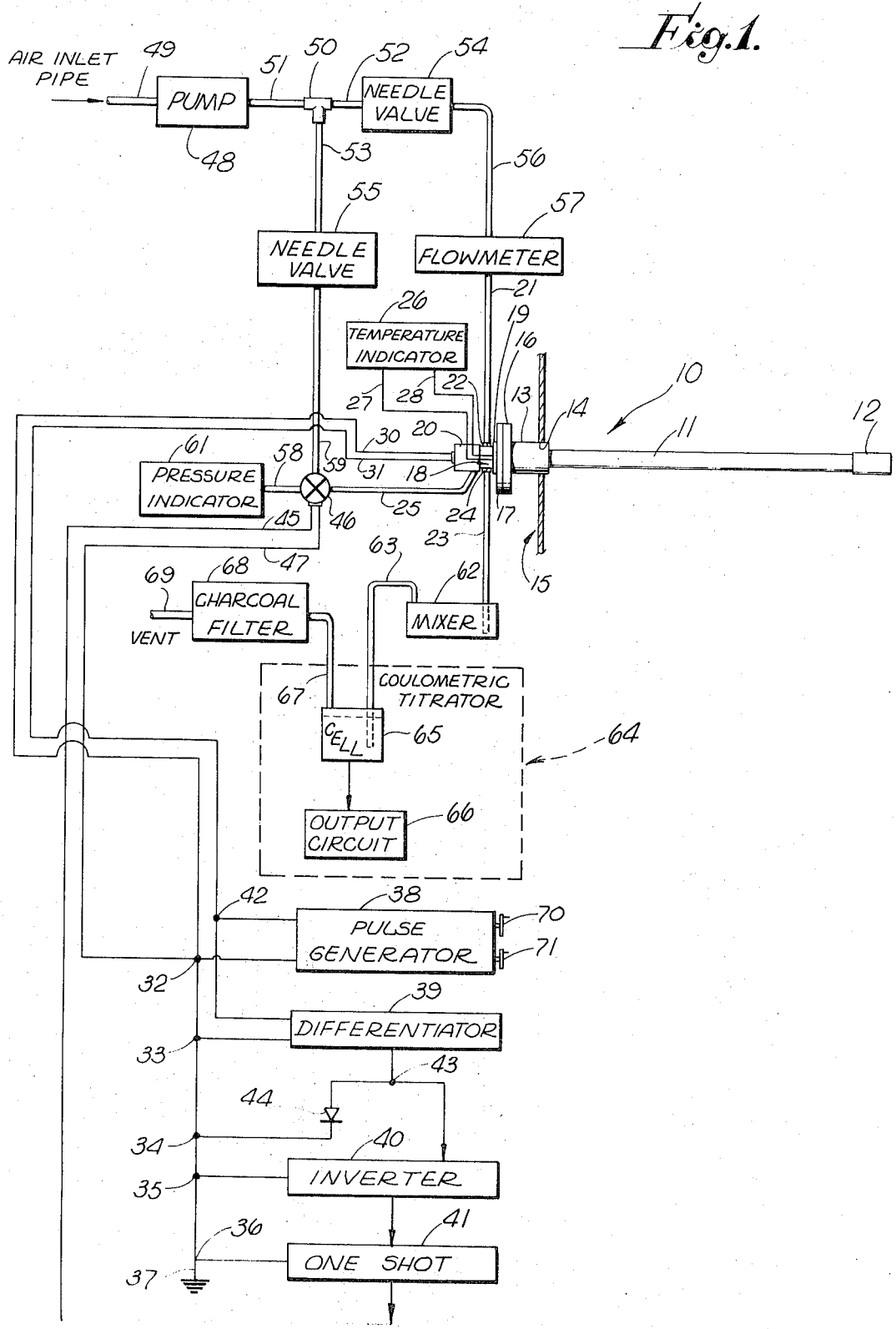

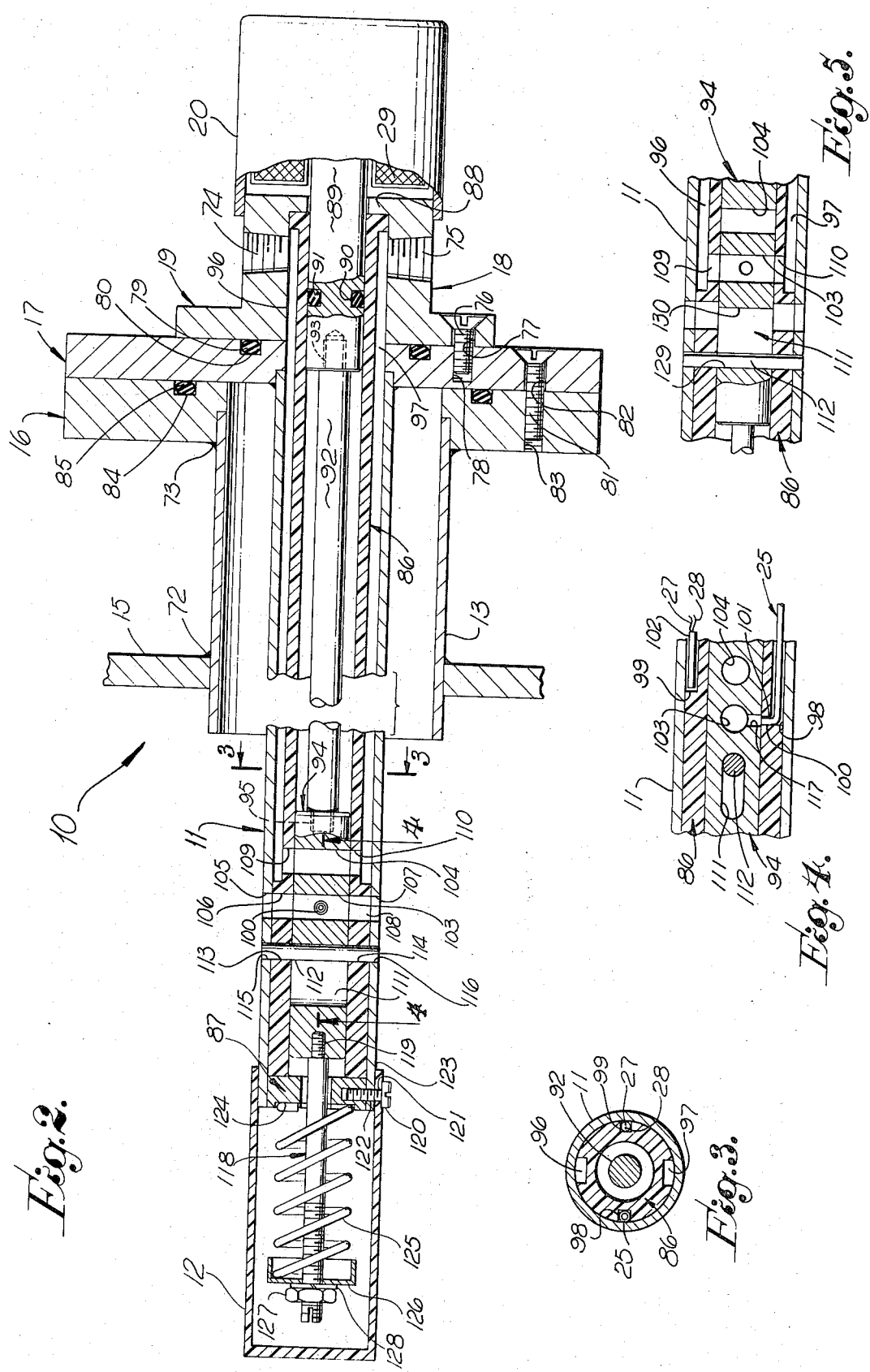

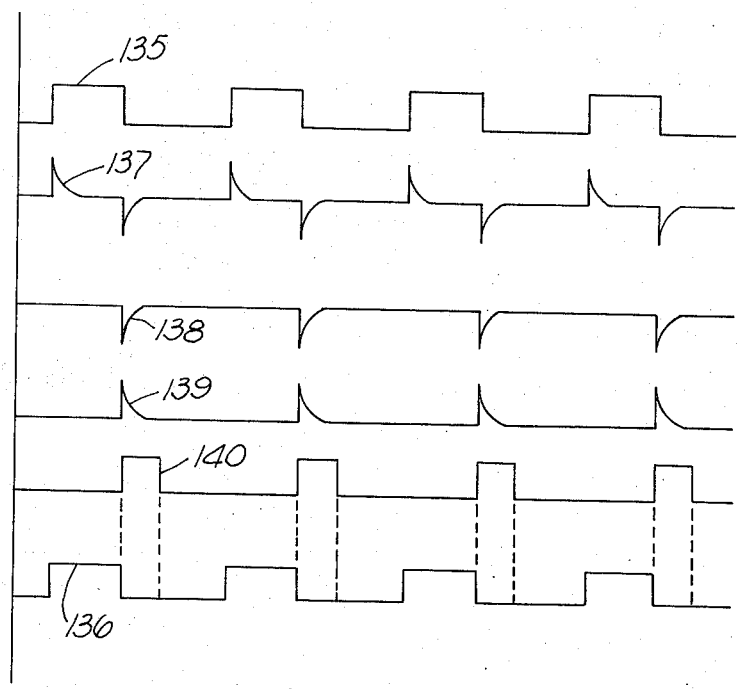
Fig. 8.
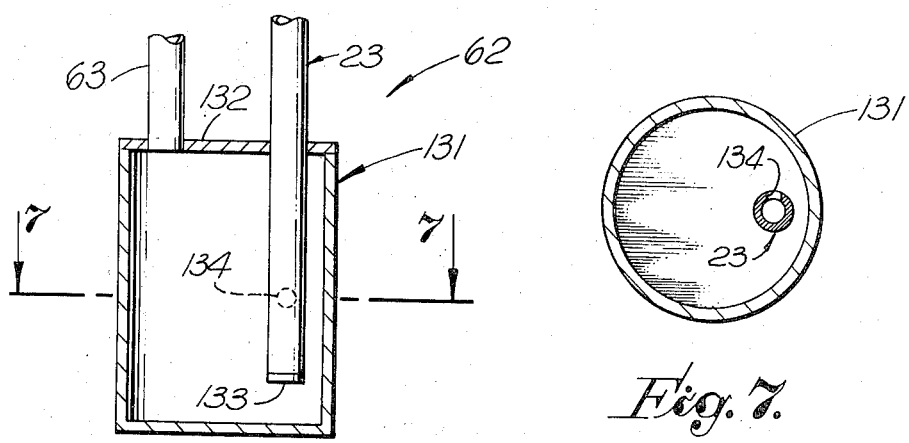
Fig. 6.
Fig. 7.

3,819,330

FLUID MONITORING SYSTEM AND FLUID SAMPLING METHOD AND APPARATUS FOR USE THEREWITH

BACKGROUND OF THE INVENTION

This invention relates to the fluid handling art, and more particularly, to a method of and apparatus for sampling a fluid and/or measuring the concentration of one or more constituents of the fluid sample.

The present invention is by no means limited to the application thereof described therein. However, the invention has been found to possess considerable utility in sampling flue gases and monitoring the hydrogen sulfide ($H_2S$) and/or sulfur dioxide ($SO_2$) therein through the use of a conventional coulometric titrator and other equipment. The titrator may, for example, be of the type described and illustrated in U.S. Pat. No. 3,448,031.

In the past, flue gas samples have been pumped, full strength, through a conduit sealed through the wall of a stack. This arrangement has a very serious disadvantage. Undiluted, the gas sample clogs the conduit.

SUMMARY OF THE INVENTION

In accordance with the present invention, the above-described and other disadvantages of the prior art are overcome by immediately diluting the sample with air after the sample is taken.

A conduit is used to move the air-gas sample out of the stack. However, the air and dilution keep this conduit relatively clean. Moreover, the dilution expands the range of the titrator and keeps it substantially cleaner for a longer period of time. The titrator has an electrolyte containing electrolytic cell, and the electrolyte thereof is therefore not depleted in a short time as in the prior art cases where the full strength sample was bubbled therethrough.

The above-described and other advantages of the present invention will be better understood when considered in connection with the accompanying drawings which are incorporated herein by this reference hereto.

BRIEF DESCRIPTION OF THE DRAWINGS

In the drawings, which are to be regarded as merely illustrative:

FIG. 1 is a diagramatic view of a monitoring system constructed in accordance with the present invention;

FIG. 2 is a broken longitudinal sectional view, partly in elevation, of a stack gas probe shown in FIG. 1;

FIG. 3 is a transverse sectional view of the probe taken on the line 3—3 shown in FIG. 2;

FIG. 4 is a broken-away longitudinal sectional view taken on the line 4—4 shown in FIG. 2;

FIG. 5 is a longitudinal sectional view of a portion of the probe shown in FIG. 2 with some parts thereof in different positions;

FIG. 6 is a vertical sectional view, partly in elevation, of a mixing tank shown in FIG. 1;

FIG. 7 is a transverse sectional view of the mixing tank taken on the line 7—7 shown in FIG. 6; and FIG. 8 is a graph of a group of waveforms characteristic of the operation of the invention.

DESCRIPTION OF THE PREFERRED EMBODIMENT

In the drawing in FIG. 1, a stack gas probe is indicated at 10 including a hollow outer tube 11 having a spring assembly cover 12 fixed thereto. A hollow tube 13 is sealed through an opening 14 in the wall 15 of a flue.

A mounting plate 16 is sealed to tube 13. A mounting plate 17 is fixed to plate 16. A cap 18 is fixed to plate 17 at a flange 19. A solenoid cover 20 is fixed to cap 18.

All of the structures 11, 13, 16, 18, 19 and 20 may be made of 316 stainless steel, if desired. The cover 12 may be made of teflon, if desired. The material of flue wall 15 may be in a conventional material.

A pipe 21 is connected to cap 18 by a fitting 22. A pipe 23 is connected to cap 18 by a fitting 24. A pipe 25 extends through cover 20 and the left end of cap 18, not shown in FIG. 1.

A temperature indicator is provided at 26 having lead wires 27 and 28 therefrom which extend through cover 20 and through the left end of cap 18.

As shown in FIG. 2, cover 20 is fixed to the right end of cap 18 and houses a solenoid winding 29. Solenoid winding 29 has a pair of lead wires connected therefrom as indicated at 30 and 31 in FIG. 1. Lead wire 30 is connected to various junctions 32, 33, 34, 35 and 36, junction 36 being grounded at 37. A pulse generator 38, differentiator 39, an inverter 40 and a one-shot multivibrator 41 are all referenced to ground by their respective connections to junctions 32 to 36, respectively. Lead 31 is connected from the output of pulse generator 38. Differentiator 39 receives an input from junction 42. The output of differentiator 39 is connected to the input of inverter 40 via a junction 43. A diode 44 is connected between junctions 34 and 43 and poled in a direction to be conductive toward junction 34.

The output of inverter 40 is connected to the input of multivibrator 41. The output of multivibrator 41 is connected to a solenoid input lead 45 of a three-way valve 46. The other lead 47 of the solenoid of valve 46 as indicated at 47 is grounded at junction 32. A pump 48 is provided to pump in ambient air. However, pump 48 may, of course, be replaced by any air supply such as an instrument air-line normally provided in many facilities. An air inlet pipe 49 is connected to the inlet of pump 48. A pipe tee 50 has three pipes 51, 52 and 53 connected therefrom. Pipe 51 is connected from the outlet of pump 48. Pipe 52 is connected to the inlet of a needle valve 54. Pipe 53 is connected to the inlet of a needle valve 55. A pipe 56 connects the outlet of needle valve 54 to the inlet of a flowmeter 57. The outlet of flowmeter 57 is connected to cap 18 via pipe 21 and fitting 22.

Valve 46 has three pipes 58, 59 and 25 connected therefrom. Pipe 58 is connected to a pressure indicator 61. Pipe 59 is connected from the outlet of needle valve 55. Pipe 25 enters probe 10. Its entire construction and purpose will be described in greater detail hereinafter.

A mixer is shown at 62 having an inlet connected from pipe 23. Mixer 62 has an outlet from which a pipe 63 is connected. A coulometric titrator is indicated at 64 including an electrolytic cell 65 having an output circuit 66 connected therefrom. Cell 65 has an inlet connected from pipe 63 and an outlet connected to a pipe 67. A charcoal filter 68 is connected from pipe 67 to a pipe 69. The left end of pipe 69, as viewed in FIG. 1, is open to the atmosphere. The gas which passes through the outlet of filter 68 is thus vented to the atmosphere. All the individual structures except the probe 10 shown in FIG. 1 may be entirely conventional, if desired. However, the combination thereof is new.

Pulse generator 38 may simply be a pulse oscillator which produces rectangular pulses. The pulse repetition frequency of pulse generator 38 is adjustable by rotation of a hand wheel 70. The time width of the output pulses of pulse generator 38 is variable by adjustment of a hand wheel 71.

Three-way valve 46 is entirely conventional. When the solenoid of three-way valve 46 is deenergized, pipe 58 is in communication with pipe 25 and pipe 59 is not in communication with either one of the pipes 58 and 25. When the solenoid of three-way valve 46 is energized, pipe 59 is in communication with pipe 25 and pipe 58 is not in communication with either one of the pipes 59 and 25.

As shown in FIG. 2, tube 13 is welded to wall 15 at 72. Plate 16 is welded to tube 13 at 73.

As shown in FIG. 2, cap 18 has threaded ports 74 and 75 into which fittings 22 and 24 are threaded, respectively.

Cap 18 is fixed relative to plate 17 by three screws 76 equally spaced around flange 19 120° apart. Each screw 76 extends through a corresponding hole 77 in flange 19 and is threaded into a corresponding hole 78 in plate 17. An O-ring 79 is located in an O-ring groove 80 in plate 17 to provide a seal between plate 17 and cap 18.

Three screws 81 hold plate 17 in a fixed position relative to plate 16. Each screw 81 extends through a corresponding hole 82 in plate 17 and is threaded into a corresponding hole 83 in plate 16. The three screws 81 are equally spaced 120° apart about plate 17.

Plate 16 has an O-ring groove 84 therein which carries an O-ring 85. The O-ring 85 provides a seal between plates 16 and 17. Hollow teflon cylinder 86 is located inside tube 11. When cylinder 86 and tube 11 are unstressed, and they are located in the positions shown in FIG. 2, they have an interference fit. Moreover, a ring 87 is fixed relative to tube 11. The left end of cylinder 86 abuts ring 87 and is held in axial compression against ring 87 when screws 76 are tightened to the position shown in FIG. 2. That is, cap 18 has an inwardly extending radial flange 88 against which the right end of cylinder 86 abuts when screws 76 are tightened.

A ferromagnetic plunger 89 is slidabble inside cylinder 86, cylinder 86 being hollow. Plunger 89 also extends to the right inside solenoid winding 29.

Plunger 89 has an annular groove 90 in which an O-ring 91 is located to provide a seal between plunger 89 and cylinder 86.

A connecting rod 92 is threaded into one end of plunger 89 at 93, and into one end of a piston 94 as indicated at 95. Piston 94 is likewise slidable in the interior of cylinder 86.

Cylinder 86 has axial grooves 96 and 97 therein which form fluid-tight gas flow passageways with tube 11 as shown in FIG. 3. The said interference fit and the said axial compression of cylinder 86 causes the edges of cylinder 86 contiguous to grooves 96 and 97 to lie in pressure contact with the internal cylindrical surface of tube 11 to provide a fluid-tight seal thereat.

Ports 74 and 75 are in communication with the passageways provided by grooves 96 and 97, respectively.

As shown in FIGS. 3 and 4, pipe 25 runs nearly the entire length of probe 10 after it enters the probe through the wall of cover 20. Pipe 25 enters probe 10 also through a hole not shown in flange 88 of cap 18. From there, it extends along the length of probe 10 inside tube 11 in another groove 98 in cylinder 86 as shown in FIGS. 3 and 4.

Wires 27 and 28 are each provided with insulation, and similarly enter probe 10 through cover 20 and through another hole in flange 88 of cap 18, not shown. The said two holes, not shown in cap flange 88, may be approximately in locations aligned with cylinder grooves 98 and 99 shown in FIG. 3. If desired, pipe 25 and leads 27 and 28 may be sealed through cap flange 88. Pipe 25 has an end portion 100 which may be sealed through a transverse hole in cylinder 86 which is in communication with groove 98, if desired.

As shown in FIG. 4, leads 27 and 28 are connected to a temperature sensitive resistor 102 which is located at the left end of groove 99 as viewed in FIG. 4. Resistor 102 may be connected in a conventional temperature indicator such as temperature indicator 26, in a bridge circuit, as is conventional. In some cases, temperature indicator 26, leads 27 and 28, resistor 102 and groove 99 may be omitted. However, these structures will be formed useful in providing a temperature indication to calibrate titrator 64.

As shown in FIGS. 2 and 4, piston 94 has two holes 103 and 104 therethrough.

With piston 94 in the position shown in FIG. 2, the upper end of hole 103 lies in registration with holes 105 and 106 in tube 11 and cylinder 86, respectively, and the lower end of hole 103 lies in registration with holes 107 and 108 in tube 11 and cylinder 86, respectively.

With piston 94 in the position shown in FIG. 2, hole 104 lies in registration with holes 109 and 110 through the wall of cylinder 86. Hole 109 provides free and open communication between the interior of groove 96 and the interior of hole 104. Hole 110 provides free and open communication between the interior of hole 104 and groove 97.

Piston 94 has a slot 111 therein which is slidable around a pin 112 that extends through a pair of holes 113 and 114 in cylinder 86 and a pair of holes 115 and 116 in tube 11. See also FIG. 4. As shown in FIG. 4, piston 94 has a hole 117 extending in a direction substantially through and substantially normal to the axis of rod 92 through hole 103. The extreme end of pipe 25 shown to the left in FIG. 4 is open. Hole 117 thus provides free and open communication from the interior of pipe 25 to the interior of hole 103.

As shown in FIG. 2, a bolt 118 is threaded into the left end of piston 94 as viewed in FIG. 2, at 119.

Cover 12 and ring 87 are both in fixed positions relative to each other and to tube 11 by three screws 120, only one of which is shown in FIG. 2. Each screw 120 is slidable through a corresponding hole 121 in cover 12 and a corresponding hole 122 in tube 11. Each screw 120 is also threaded into a corresponding hole 123 in ring 87.

Ring 87 has a central recess 124 in which a helically coiled spring 125 rests. A cupped shaped spring follower 126 encloses the left end of spring 125 and is slidable over bolt 118. The compression of spring 125 is adjustable by a nut 127 threaded onto the end of bolt 118 as viewed in FIG. 2. A washer 128 is slidable on bolt 118 between nut 127 and follower 126.

When solenoid 29 is deenerigized, the position of all the structures in the probe 10 are as indicated in FIG. 2. When solenoid 29 is energized, piston 94 is moved to the position shown in FIG. 5. Note will be taken in FIG. 5 that piston hole 104 is no longer in registration with cylinder holes 109 and 110. Further, piston hole 103 is now in alignment with cylinder holes 109 and 110.

As shown in FIG. 5, slot 111 has two opposite ends 129 and 130. In the position shown in FIGS. 2 and 4, pin 112 engages end 130 of slot 111. In FIG. 5, pin 112 engages end 129 of slot 111. Thus, pin 112 acts as a stop piston 94 in its left hand and right hand extreme limits of travel.

Note will be taken from FIGS. 2, 4, and 5 that all the holes 103, 104, 105, 106, 107, 108, 109 and 110 may be exactly the same diameter. However, some variation is, of course, possible.

From the foregoing, it will also be appreciated that the distance between the ends 129 and 130 of slot 111 is equal to the distance between the axes of holes 103 and 104.

In FIG. 6, an enlarged sectional view of mixer 62 is shown. Mixer 62 includes simply a mixing tank or equalization tank 131 which is sealed in a fluid-tight manner. Thus, the interior of tank 131 is fluid tight except for openings in pipes 23 and 63. The lower end of pipe 63 is open to the interior of tank 131. Pipes 23 and 63 are sealed through an upper wall 132 of tank 131. The lower end of pipe 23 is sealed by a cover 133.

As shown in both FIGS. 6 and 7, pipe 23 has a circular hole 134 extending completely through the wall thereof.

As shown in FIG. 8, pulse generator 38 may produce output pulses as indicated at 135 and 136. The pulses 135 and 136 are shown twice in FIG. 8 to demonstrate the synchronous characteristics of waveforms immediately adjacent thereto. The output of differentiator 39 with diode 44 disconnected is indicated at 137. Diode 44 merely shunts the positive pulses to waveform 137 to ground, and applied only the negative output pulses thereof to inverter 40 as indicated at 138.

Inverter 40 simply inverts pulses 38 as indicated at 139. The output of multivibrator 41 is indicated at 140.

Although the exact location of pulses 140 relative to pulses 136 is not critical, the pulses 140 should occur between the pulses 136. The time width and the location of pulses 140 between the pulses 136 thus is not otherwise critical.

In accordance with the system of FIG. 1, the leading edges of pulses 140 occur at the same time or at a very short time later than the trailing edges of pulses 136. The time widths of purge pulses 140 should be less than the times between pulses 136 so that a sample can be taken. Moreover, for the same reason the trailing edges of pulses 140 should precede the leading edges of pulses 136 by an adequate time period.

OPERATION

In the operation of the embodiment of the invention shown in FIG. 1, pump 48 supplies air, which may be passed through a charcoal filter, not shown, if desired, to obtain clean air. The output of pump 48 is supplied to cap port 74 and groove 96 via pipes 51 and 52, needle valve 54, pipe 56, flowmeter 57, pipe 21 and fitting 22. This air is supplied continuously. In the position shown in FIG. 2, the air flows through groove 96, holes 109, 104, 110, groove 97, port 75, fitting 24, and pipe 23 to mixer 62. As stated previously, tank 131 of mixer 62 provides a mixing or equalization chamber. It is not necessary for the probe 10 to be purged of the sample fluid. In other words, small samples may be conveyed in spaced apart relation in groove 97 as they emanate from piston hole 104. At any rate, piston 94 is reciprocated from the position shown in FIG. 2 to the position shown in FIG. 5, and then back again to the position shown in FIG. 2, and so on. Each time the piston 94 is in the position shown in FIG. 2, flue gas will fill holes 105, 106, 103, 107, and 108. That portion of the flue gas in hole 103 will then be transported within hole 103 to the position shown in FIG. 5. In this position, air flowing in through hole 109 from groove 96 will carry the sample out of hole 103 through hole 110 into groove 97. On the return, piston 94 will move to the left from the position shown in FIG. 5 to the position shown in FIG. 2. Another sample will then be taken in the same manner.

Notwithstanding the foregoing, once piston 94 has returned to the position shown in FIG. 2, if this position is called the sampling position, the holes 105, 106, 103, 108 and 107 are purged with air for a short time immediately after piston 94 has returned to the position shown in FIG. 2. This purging takes place because multivibrator 41 energizes valve 46 and directs the pump output through needle valve 55 to pipe 25. However, purging cannot take place during the entire period that piston 94 remains in the position shown in FIG. 2, because, if it does, no sample will be available when piston 94 is moved to the right, as viewed in FIG. 2 by energization of solenoid winding 29. This is the reason that the pulse width of pulses 140 in FIG. 8 is less than the pulse spacing of pulses 136 shown therein. Mixer 62 takes the "pulses of air" and the "pulses of sample fluid" and mixes them together. Hydrogen sulfide or sulfur dioxide are then measured. That is, the output of mixer 62 is passed through titrator 64 and an indication of the corresponding one or both of the sulfur compounds in the flue gas mixture is indicated. Titrator 64 may be entirely conventional and may be identical, if desired, to the titrator shown in the said patent.

The purpose of needle valve 54 is to adjust the sample dilution provided by adding air to the fluid samples obtained as described previously. The purpose of needle valve 55 is to adjust the air purge pressure.

It is an outstanding advantage, among others, of the present invention that a fluid sample is moved along in a conduit by a carrier fluid and that the carrier fluid is employed to dilute fluid samples.

It is another outstanding advantage of the present invention that dilution begins immediately at the precise point of sampling far within the wall of the flue. By diluting the fluid samples at this early time, it is possible to keep the flow passageways, pipe, etc., clean and clear whereas this was not possible by using any prior art method of structure.

Still another outstanding advantage of the present invention resides in the fact that dilution can be employed to keep the titrator 64 relatively clean. It also can be employed to expand the range of the titrator 64. The electrolyte employed in cell 65 also does not become depleted in a short time as in the case of the prior art.

Many changes and modification in the present invention may be made, of course, without departing from the true scope thereof as defined in the appended claims. For example, solenoid winding 29 is employed as a pull-type solenoid. A push-type solenoid may be employed by merely reversing the action of spring 25.

It is another feature of the invention that the same pipe 25 is employed for purge holes 105, 106, 103, 107 and 108, and supplying a pressure signal from the interior of hole 103 to indicator 61. Again, indicator 61 and the required associated equipment is optional but desirable to calibrate titrator 64.

As stated previously, fluid-tight seals for the passageways provided by grooves 96 and 97 are effected by the said interference fit of cylinder 86 and tube 11, and by the axial compression of cylinder 86 inside tube 11. Good fluid-tight seals are provided for the reason that cylinder 86 is made of teflon, and teflon has a bulk modulus of elasticity substantially less than that of the tube 11, the tube 11 being made of 316 stainless steel. However, change of materials is easily possible as long as the cylinder modulus is greater than the tube modulus.

Although a regular air purge may be desirable in some cases, an irregular purge or a purge for every n samples may be employed, wherein is any positive integer other than unity.

The phrase "means providing a conduit" is hereby defined for use herein and in the claims to follow to include but not be limited to any means forming a conduit or equivalent including or not limited to a portion of a passage. For example, passageways are formed in grooves 96 and 97. Thus, all or portions of the grooves 96 and 97 may be considered conduits because portions of cylinder 86 and tube 11 surrounding the space within the grooves 96 and 97 are actually conduits.

Although a ground has been shown at 37, a system of the present invention may be operated without a true ground.

What is claimed is:

1. Fluid sampling apparatus comprising: a first body; a second body movably mounted relative to said first body, said second body having a first hole extending completely therethrough; first and second means providing first and second respective conduits mounted in substantially fixed positions relative to said first body, said first hole having first and second ends, said first conduit having a first open end, said second conduit having a second open end, said second body being movable to a first position in which a sample fluid can at least partially fill said first hole; said second body also being movable to a second position different from said first position in which said first and second first hole ends lie contiguous to and in at least partial registration with said first and second conduit ends, respectively; and third means to supply a carrier fluid under pressure to said first conduit in a manner to cause it to flow through said first hole into second conduit and to carry any fluid sample in said first hole with it into said second conduit when said second body is in said second position thereof, said first body including a first hollow cylinder having substantially concentric internal and external cylindrical surfaces except for first and second axially extending grooves in the cylindrical external surface thereof, said first and second grooves being angularly spaced from each other around said first cylinder, said second body having a cylindrical portion slidable contiguously within said first cylinder, said first hole extending in a direction approximately through and approximately normal to the axis of said first cylinder, and a second hollow cylinder having substantially concentric internal and external cylindrical surfaces, said first cylinder being positioned inside said second cylinder with portions of said first cylinder external surfaces between each pair of sides of said first and second grooves in fluid tight sealing engagement with the internal surface of said second cylinder, said first and second cylinders each having first and second radially extending openings through the walls thereof, said cylinder first openings lying in registration with each other, and with said first end of said first hole when said second body is in said second position thereof, said cylinder second openings lying in registration with each other and with said second end of said first hole when said second body is in said second position thereof; said second cylinder enclosing said grooves to form fluid tight passageways therein, said first and second means each including portions of said cylinders surrounding said grooves, said passageways being the respective conduits of said first and second means.

2. The invention as defined in claim 1, wherein said second body has a second hole extending completely therethrough which is spaced from said first hole and located in a position such that it has first and second ends contiguous to and lying at least in partial registration with said first and second conduit ends, respectively, when said second body is in said first position.

3. Fluid sampling apparatus comprising: a first body, a second body movably mounted relative to said first body, said second body having a first hole extending completely therethrough; first and second means providing first and second respective conduits mounted in substantially fixed positions relative to said first body, said first hole having first and second ends, said first conduit having a first open end, said second conduit having a second open end, said second body being movable to a first position in which a sample fluid can at least partially fill said first hole; said second body also being movable to a second position different from said first position in which said first and second first hole ends lie contiguous to and in at least partial registration with said first and second conduit ends, respectively; third means to supply a carrier fluid under pressure to said first conduit in a manner to cause it to flow through said first hole into said second conduit and to carry any fluid sample in said first hole with it into said second conduit when said second body is in said second position thereof; electrically actuable fourth means are provided to shift said second body from said first position thereof to said second position thereof and vice versa, fifth means to actuate said fourth means in a manner to cause said body to be shifted repeatedly to said first and second positions thereof alternately, said body remaining in said first position for a first period of time and in said second position for a second period of time, said periods being substantially constant in length and each recurring at a substantially constant frequency, said second body having a second hole extending completely therethrough which is spaced from said first hole and located in a position such that it has first and second ends contiguous to and lying at least in partial registration with said first and second conduit ends, respectively, when said second body is in said first position; a coulometric titrator having an electrolytic cell and an output circuit connected therefrom, said cell having an input conduit connected from the end of said second conduit opposite said second end thereof; and sixth means to mix together the carrier fluid and fluid sample flowing in said second conduit being provided, said sixth means being connected between said opposite end of said second conduit and said cell input conduit.

4. The invention as defined in claim 3, wherein said sixth means includes a hollow tank having a transverse cross section substantially larger than that of said first and second conduits, said first and second conduits being sealed through said tank, said conduits having openings into the interior of said tank at substantially opposite ends thereof, said first conduit being connected to said cell inlet conduit, said second conduit being connected to the said opposite end of said second conduit.

5. Fluid sampling apparatus comprising: a first body; a second body movably mounted relative to said first body, said second body having a first hole extending completely therethrough; first and second means providing first and second respective conduits mounted in substantially fixed positions relative to said first body, said first hole having first and second ends, said first conduit having a first open end, said second conduit having a second open end, said second body being movable to a first position in which a sample fluid can at least partially fill said first hole; said second body also being movable to a second position different from said first position in which said first and second first hole ends lie contiguous to and in at least partial registration with said first and second conduit ends, respectively; third means to supply a carrier fluid under pressure to said first conduit in a manner to cause it to flow through said first hole into said second conduit and to carry any fluid sample in said first hole with it into said second conduit when said second body is in said second position thereof; electrically actuable fourth means being provided to shift said second body from said first position thereof to said second position thereof and vice versa, fifth means to actuate said fourth means in a manner to cause said body to be shifted repeatedly to said first and second positions thereof alternately, said body remaining in said first position for a first period of time and in said second position for a second period of time, said periods being substantially constant in length and each recurring at a substantially constant frequency; a coulometric titrator having an electrolytic cell and an output circuit connected therefrom, said cell having an input conduit connected from the end of said second conduit opposite said second end thereof; and sixth means to mix together the carrier fluid and fluid sample flowing in said second conduit being provided, said sixth means being connected between said opposite end of said second conduit and said cell input conduit.

6. Fluid sampling apparatus comprising: a first body; a second body movably mounted relative to said first body, said second body having a first hole extending completely therethrough; first and second means providing first and second respective conduits mounted in substantially fixed positions relative to said first body, said first hole having first and second ends, said first conduit having a first open end, said second conduit having a second open end, said second body being movable to a first position in which a sample fluid can at least partially fill said first hole; said second body also being movable to a second position different from said first position in which said first and second first hole ends lie contiguous to and in at least partial registration with said first and second conduit ends, respectively; third means to supply a carrier fluid under pressure to said first conduit in a manner to cause it to flow through said first hole into said second conduit and to carry any fluid sample in said first hole with it into said second conduit when said second body is in said second position thereof, said second body having a third hole therethrough which intercepts said first hole, a spring biased three-way valve having a solenoid operator and first and second inlets and an outlet, a third conduit connected from said first inlet to said third hole, a fourth conduit connected from said third means to said second inlet, a pressure indicator connected from said outlet, and sixth means to energize said solenoid to cause said first and second inlets to be connected, said first inlet being connected to said outlet when said solenoid is deenergized.

7. Fluid sampling apparatus comprising: a first body; a second body movably mounted relative to said first body, said second body having a first hole extending completely therethrough; first and second means providing first and second respective conduits mounted in substantially fixed positions relative to said first body, said first hole having first and second ends, said first conduit having a first open end, said second conduit having a second open end, said second body being movable to a first position in which a sample fluid can at least partially fill said first hole; said second body also being movable to a second position different from said first position in which said first and second first hole ends lie contiguous to and in at least partial registration with said first and second conduit ends, respectively; third means to supply a carrier fluid under pressure to said first conduit in a manner to cause it to flow through said first hole into said second conduit and to carry any fluid sample in said first hole with it into said second conduit when said second body is in said second position thereof; electrically actuable fourth means being provided to shift said second body from said first position thereof to said second position thereof and vice versa, fifth means to actuate said fourth means in a manner to cause said body to be shifted repeatedly to said first and second positions thereof alternately, said body remaining in said first position for a first period of time and in said second position for a second period of time, said periods being substantially constant in length and each recurring at a substantially constant frequency, said second body having a third hole therethrough which intercepts said first hole, a spring biased three-way valve having a solenoid operator and first and second inlets and an outlet, a third conduit connected from said first inlet to said third hole, a fourth conduit connected from said third means to said second inlet, a pressure indicator connected from said outlet, and sixth means to energize said solenoid to cause said first and second inlets to be connected, said first inlet being connected to said outlet when said solenoid is deenergized.

8. Flow control apparatus, said apparatus comprising: concentric inner and outer cylinders, said inner cylinder having an outer cylindrical surface, said outer cylinder having an internal cylindrical surface, said inner cylinder outer surface having a groove therein, each side of said groove lying in pressure contact with said outer cylinder internal surface and providing a fluid tight seal thereat, said groove providing a fluid tight passageway between and surrounded by said cylinders, said cylinders having an interference fit when neither of them are otherwise stressed.

9. The invention as defined in claim 8, including a plate at least partially closing one end of said outer cylinder, and at least a partial closure for the other end of said outer cylinder holding said inner cylinder in axial compression between said plate and said closure.

10. The invention as defined in claim 9, wherein said outer cylinder is made of material having a bulk modulus of elasticity substantially greater than that of said inner cylinder.

11. Flow control apparatus, said apparatus comprising: concentric inner and outer cylinders, said inner cylinder having an outer cylindrical surface, said outer cylinder having an internal cylindrical surface, said inner cylinder outer surface having a groove therein, each side of said groove lying in pressure contact with said outer cylindrical internal surface and providing a fluid tight seal thereat, said groove providing a fluid tight passageway between and surrounded by said cylinders; a plate at least partially closing one end of said outer cylinder, and at least a partial closure for the other end of said outer cylinder holding said inner cylinder in axial compression between said plate and said closure.

12. The invention as defined in claim 11, wherein said outer cylinder is made of material having a bulk modulus of elasticity substantially greater than that of said inner cylinder.

13. Flow control apparatus, said apparatus comprising: concentric inner and outer cylinders, said inner cylinder having an outer cylindrical surface, said outer cylinder having an internal cylindrical surface, said inner cylinder outer surface having a groove therein, each side of said groove lying in pressure contact with said outer cylinder internal surface and providing a fluid tight seal thereat, said groove providing a fluid tight passageway between and surrounded by said cylinders.

* * * * *